J. H. SCHEID.
NOSE RING.
APPLICATION FILED DEC. 27, 1917.
1,276,122.
Patented Aug. 20, 1918.
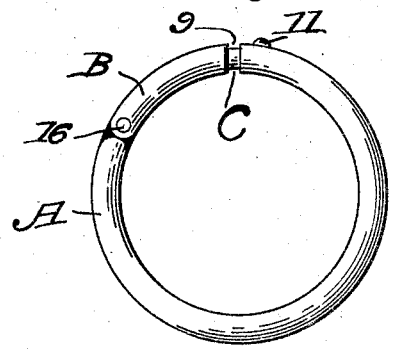
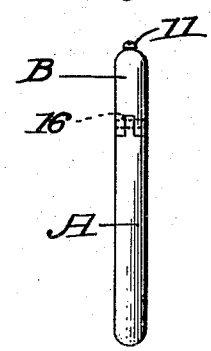
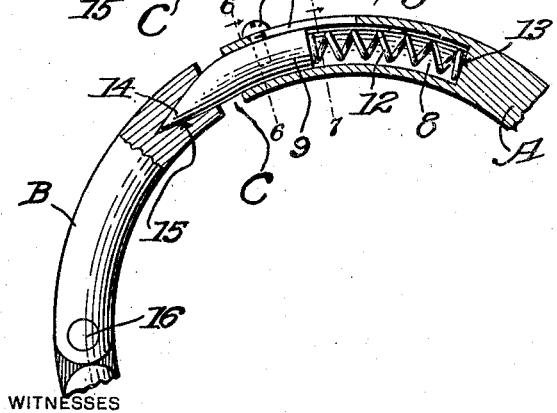
INVENTOR,
John H. Scheid,
WITNESSES
BY
ATTORNEY

UNITED STATES PATENT OFFICE.

JOHN H. SCHEID, OF MINNEAPOLIS, MINNESOTA.

NOSE-RING.

1,276,122.  Specification of Letters Patent.  Patented Aug. 20, 1918.

Application filed December 27, 1917. Serial No. 209,088.

*To all whom it may concern:*

Be it known that I, JOHN H. SCHEID, a citizen of the United States, residing at Minneapolis, in the county of Hennepin and State of Minnesota, have invented certain new and useful Improvements in Nose-Rings, of which the following is a specification.

My invention relates to a ring of the type applied to the noses of certain animals and known in the art of animal husbandry as "bull rings".

The main object of the present invention is to provide an article of this type which may be positioned at the nose cartilage or other part of the nose, and released to effect its own fastening and thus avoid the use of tools during that operation, undue annoyance to the animal and shorten the time required for application to the nose, to thus minimize the risk of attacks by vicious animals during application of the article to their noses.

The prime object is to provide a combined nose-piercing and ring-fastening member; preferably one urged to closed position by a spring and with its extent of movement limited by an operating member, and with the ring in two sections hinged together and with the member described housed in the end of one of the sections and adapted to enter the end of the other section.

I also aim to provide the particular construction of ring hereinafter described in detail, pointed out in accompanying drawings and claimed.

With the above and additional objects such as will be apparent as the description progresses, in view, the invention has been embodied in one preferred form as illustrated in the drawings referred to.

In said drawings:—

Figure 1 is an elevational view of the improved ring;

Fig. 2 is an edge view looking from the left of Fig. 1;

Fig. 3 is an edge view looking from the top of Fig. 1;

Fig. 4 is a fragmentary view, mostly in section, to illustrate the operating parts;

Fig. 5 is a detail view partly in elevation and partly in section to show the shape of the combined nose-piercing and ring-fastening member in plan or top;

Fig. 6 is a detail cross sectional view on the line 6—6 of Fig. 4, and

Fig. 7 is a detail cross sectional view on the line 7—7 of Fig. 4.

Referring specifically to the drawings, the ring comprises essentially a section A and a section B. As shown the ring is preferably annular but it may be made of any approved shape. When the sections are in closed position, a space or gap is preferably provided at C.

One end of section A is hollowed to provide a recess 8 in which a combined nose-piercing and ring-fastening member 9 is slidably disposed. Any suitable means may be employed to limit the movement of the member 9 and to secure it within the recess. A very simple construction for effecting this purpose is shown in the drawings and includes an elongated slot 10 provided in section A through which a pin 11 passes and which is mounted by the member 9. This pin 11 is preferably a set-screw as shown in the drawing whose screw threads engage screw-threads provided in a recess of the member 9 as will be apparent. A coil spring 12 is also disposed in the recess 8, having one end abut the member 9 and the other end abut a wall of the section A at 13. The spring 12 is of the expansive type so as to normally urge the member 9 away from the wall 13. Also the coils of the springs are of greater diameter than the width of the slot 10 so that the spring cannot escape through the slot and so that the spring will be secured in place as well as the member 9 by the set-screw 11.

The combined nose-piercing and ring-fastening member 9 is preferably annular in cross section as shown by Fig. 6. The side wall for the major portion of the length of member 9 however is on a line concentric with the line of the ring as is also the side wall of the recess 8. From the said concentric wall, the member 9 tapers inwardly to a piercing point at 14, and thus no interference is offered by the shape of member 9 to its effective sliding movement. Piercing point 14 slides into a recess 15 provided in one end of the section B and which is of the same shape as the portion of member 9 which it receives.

Sections A and B are movable relatively and preferably to this end are hinged or pivoted together at 16. Section B moves from the pivot 16 outwardly away from the member 9. It will be noted that section A is considerably more than a half ring. This is for the purpose of providing the pivot 16 relatively close to the member 9 so that when the member 9 slides into the recess 15 the two sections of the ring will be locked or fastened in continuous form.

In use, when ready to attach the ring to the nose of the animal, set-screw 11 is engaged by a finger of the husbandman and moved toward the wall 13 so as to position member 9 completely within the recess 8. Section B is then swung outwardly. The ring is at this stage brought into engagement with the nose of the animal at the cartilage or other appropriate part, such part being received in the space C. When the device is thus positioned, the finger of the husbandman is moved out of engagement with the set-screw 11 whereupon the ring 12 which has been tensioned by the retraction of member 9 will expand and urge the member 9 through the portion of the nose in its path of movement and the point 14 into the recess 15, thus piercing the nose and effecting the fastening of the sections A and B together. In some instances, as where a very loose pivotal connection is provided at 16, it is advisable to hold the section B in closed position until the member 9 has pierced the nose and the point 14 has entered the recess 15.

Since merely the preferred embodiment has been illustrated and described, it is to be understood that various changes in the details of construction and operation of the parts may be resorted to provided they fall within the spirit and scope of the invention as defined by appended claim.

I claim:—

A ring of the class described comprising a body of arcuate formation provided with a bore in one end thereof, an arcuate section hingedly connected to the opposite end of the body and provided with a bore, said section terminating short of the opposite end of the body to form an entrance opening for a portion of a nose, a spring in the bore of the body portion, a sliding member in said bore, said member bridging the entrance opening, a piercing point formed on the sliding member and entering the bore in the arcuate section, and means for disengaging the sliding members.

In testimony whereof I affix my signature in presence of two witnesses.

JOHN H. SCHEID.

Witnesses:
DAVE MARLAN,
R. H. BEEBE.

Copies of this patent may be obtained for five cents each, by addressing the "Commissioner of Patents. Washington, D. C."